United States Patent
Henry

(10) Patent No.: US 9,033,633 B2
(45) Date of Patent: May 19, 2015

(54) TALL TOILET BOLT CAP

(71) Applicant: John A. Henry, Spokane, WA (US)

(72) Inventor: John A. Henry, Spokane, WA (US)

(*) Notice: Subject to any disclaimer, the term of this patent is extended or adjusted under 35 U.S.C. 154(b) by 0 days.

(21) Appl. No.: 14/226,604

(22) Filed: Mar. 26, 2014

(65) Prior Publication Data
US 2014/0294533 A1    Oct. 2, 2014

Related U.S. Application Data

(60) Provisional application No. 61/806,735, filed on Mar. 29, 2013.

(51) Int. Cl.
*F16B 37/14*    (2006.01)
*A47K 11/00*    (2006.01)

(52) U.S. Cl.
CPC ................. *F16B 37/14* (2013.01); *A47K 11/00* (2013.01)

(58) Field of Classification Search
USPC .......... 411/373–374, 427, 429, 430, 431, 437
See application file for complete search history.

(56) References Cited

U.S. PATENT DOCUMENTS

| | | | | | |
|---|---|---|---|---|---|
| 2,538,483 | A | * | 1/1951 | Summers | 411/374 |
| 2,653,835 | A | * | 9/1953 | Nelson | 411/222 |
| 2,819,642 | A | * | 1/1958 | Refrigeri | 411/373 |
| 3,273,441 | A | * | 9/1966 | Biesecker | 411/429 |
| 3,419,298 | A | * | 12/1968 | Worley | 403/24 |
| 3,548,704 | A | * | 12/1970 | Kutryk | 411/373 |
| 4,884,933 | A | * | 12/1989 | Preusker et al. | 411/177 |
| 5,590,992 | A | * | 1/1997 | Russell | 411/431 |
| D417,491 | S | | 12/1999 | Frazer et al. | |
| 6,125,479 | A | | 10/2000 | Fraleigh | |
| 6,698,986 | B2 | | 3/2004 | Fraleigh | |
| 6,802,681 | B2 | * | 10/2004 | Cheal | 411/431 |
| 6,808,350 | B1 | | 10/2004 | Tooman et al. | |
| D527,810 | S | | 9/2006 | Frazer et al. | |
| 7,658,580 | B1 | | 2/2010 | Conway et al. | |

* cited by examiner

*Primary Examiner* — Roberta Delisle
(74) *Attorney, Agent, or Firm* — Lee & Hayes, PLLC

(57) ABSTRACT

Decorative toilet bolt caps having and elongated tube positioned above an aperture are disclosed. The cap may be formed of a single unit of material. By virtue of having an elongated tube positioned above an aperture, the cap may cover a closet bolt having an unreduced length.

14 Claims, 2 Drawing Sheets

TALL TOILET BOLT CAP

RELATED APPLICATIONS

The present application claims priority to U.S. Provisional Application No. 61/806,735 filed on Mar. 29, 2013, entitled "Tall Toilet Bolt Cap #2," which is incorporated by reference in its entirety.

BACKGROUND

Caps for covering toilet bolts exist. For example, cap assemblies exist that have a cap that couples to a wafer. In this example, the cap assembly couples to the wafer to cover a toilet bolt that has been trimmed from an off-the-shelf length of about 2.5 inches to a trimmed length of about 2.0 inches. In another example, caps exist that thread on a toilet bolt. Again, and in this example, the cap threads on a toilet bolt that has been trimmed from an off-the-shelf length of about 2.5 inches to a trimmed length of about 2.0 inches.

While these caps may cover trimmed toilet bolts, trimming the toilet bolt is not trivial and takes time. Accordingly, there remains a need in the art for improved toilet bolt caps that do not require trimming the toilet bolts.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This application describes caps having an elongated tube positioned above an aperture or cavity, the elongated tube for receiving a bolt having an unreduced length and the aperture for receiving a nut and/or a washer fastened to the bolt. By virtue of having an elongated tube for receiving a bolt having the unreduced length and an aperture for receiving a nut and/or a washer fastened to the bolt, caps according to this disclosure cover a bolt assembly fastening a toilet to a floor without having to reduce a length of a bolt of the bolt assembly. This allows a same cap and bolt kit to be used with toilets having a wide range of flange thicknesses and or wide range of flooring thicknesses. In addition to covering a bolt having an unreduced length, by virtue of having an elongated tube positioned above an aperture, caps according to this disclosure are able to cover trimmed bolt assemblies fastening toilets to floors that are missing caps. For example, because the cap has an elongated tube positioned above a bottom aperture, the elongated tube can fasten to a trimmed bolt. Consequently, a user is able to cover aesthetically unpleasing trimmed toilet bolts that are missing caps. For example, the same cap used to couple with a bolt having an unreduced length can be used to couple with a bolt having a reduced length. Additionally, with the cap fastened to the bolt, the cap is less likely to be dislodged or removed and subsequently lost.

In one example, the cap may be formed of a single unit of material and comprise an elongated tube positioned a distance from a bottom aperture. The elongated tube is sized to fasten to a bolt having an unreduced length and to fasten a toilet to a floor, and the receptacle is sized to receive a nut threaded on the bolt. In this example, the bolt having the unreduced length is sized to have a length sufficient to extend through the toilet flange of a wide range of thicknesses such that a portion of the bolt extending through the flange will extend at least partially into the elongated tube.

In another example, a kit may include one or more of the caps, one or more bolt assemblies, and/or one or more wax gaskets to mount a toilet to a floor.

While the caps are described in various embodiments herein in the context of caps for closet bolts fastening toilets to floors, the caps may also be used and adapted for other purposes. For example, the caps may be used and adapted for use in the toy industry, auto industry, industrial environment, or the like.

While the caps are described in various embodiments herein as having a substantially dome shape, the caps may be other shapes. For example, the caps may be substantially cylindrical, conical, oval, or prism shape (e.g., having a rectangular, triangular, or other cross section), or the like.

Illustrative Caps

Figure 1:
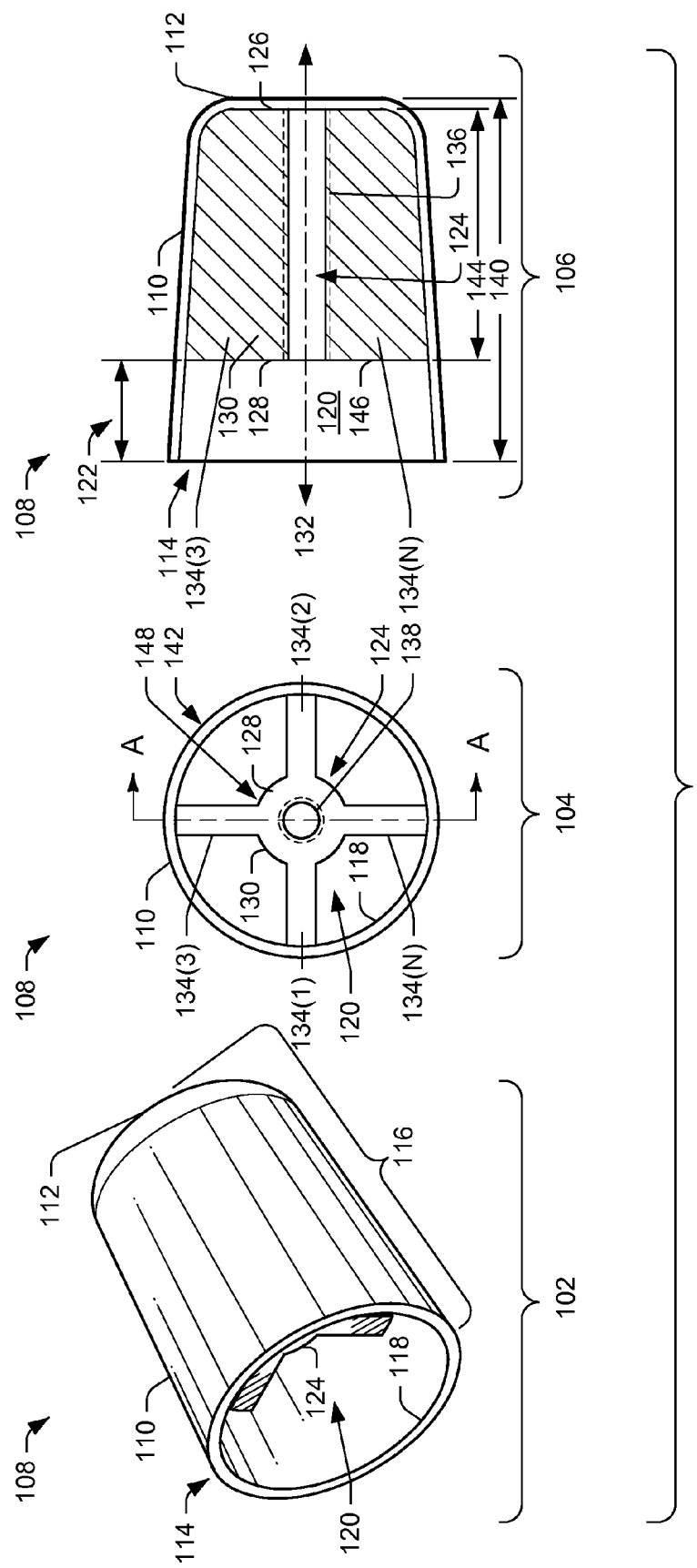
FIG. 1 depicts a perspective view, a bottom view, and a cross-sectional view of an illustrative cap for covering a bolt having an unreduced length.

FIG. 1 depicts a perspective view 102, a bottom view 104, and a cross-sectional view 106 of an illustrative cap 108 for covering a bolt having an unreduced length. The cap 108 may be a decorative cap for covering a closet bolt assembly. For example the cap 108 may be a decorative cap for covering a closet bolt assembly fastening a toilet to a floor. Because the cap 108 is arranged to cover a bolt having an unreduced length, a user may fasten a toilet to a floor without reducing a length of a bolt to cover the bolt with the cap.

For example, because the cap 108 covers a bolt having an unreduced length, a toilet can be installed without cutting off an excess amount of the bolt before tightening the toilet to the floor. Further, because the cap 108 covers a bolt having an unreduced length, a toilet can be installed without cutting of an excess amount of the bolt after tightening the toilet to the floor. Moreover, because the cap 108 covers a bolt having an unreduced length, a toilet can be installed without snapping off an end of the bolt after tightening the toilet to the floor. Further, because the cap 108 is arranged to cover an unreduced length of a bolt, a user may install a toilet in less time than compared to having to reduce a length of the bolt.

The caps 108 may include a body 110 having a top 112 opposite a bottom aperture 114, and a wall 116 extending from the top 112 to the bottom aperture 114. The bottom aperture 114 may have an edge 118 arranged around an inside of the bottom aperture 114 defining a receptacle 120. The receptacle 120 may extend a distance 122 from the bottom aperture 114 toward the top 112 of the body 110. For example, the receptacle 120 may extend a distance 122 of about ¼ inches to about ⅞ inches from the bottom 114 of body toward the top 112 the body 110. The receptacle 120 may be arranged to removably receive a nut, a washer, and/or a wafer. For example, receptacle 120 may be arranged to removably receive a nut and/or a washer of a closet bolt assembly.

The caps 108 may include an elongated tube 124 having a top 126 opposite a bottom 128 and a wall 130 extending from the top 126 to the bottom 128. While the elongated tube 124 is illustrated as being attached to the top 112 of the body 110, the elongated tube 124 may not be attached to the top 112 of the body 110. For example, the top 126 of the elongated tube 124 may be arranged a distance away from the top 112 of the body 110 to provide a void for receiving a top portion of an unreduced length of a bolt. The bottom 128 of the elongated tube 124 may be positioned the distance 122 from the bottom aperture 114.

For example, the bottom 128 of the elongated tube 124 may be positioned the distance 122 from the bottom aperture 114 so that the bottom 128 of the elongated tube 124 does not interfere with a nut threaded on an unreduced length of a bolt. Further, the bottom 128 of the elongated tube 124 may be positioned the distance 122 from the bottom aperture 114 so that the bottom 128 of the elongated tube 124 may couple with a trimmed bolt. For example, the bottom 128 of the elongated tube 124 may be positioned at the distance 122 from the bottom aperture 114 so that the bottom 128 of the elongated tube 124 may thread onto a trimmed or snapped bolt. The elongated tube 124 may be arranged longitudinally along a longitudinal axis 132 of the body 110 for coupling the cap 108 to a bolt.

The cap 108 may include multiple fins 134(1), 134(2), 134(3), 134(N) arranged longitudinally along the longitudinal axis 132 of the body 110. The fins 134(1)-134(N) may be interposed between the wall of the body 110 and the elongated tube 124. Each fin 134(1)-134(N) may be spaced along a perimeter of the wall 130 of the elongated tube 124, forming a structural member for the elongated tube 124. For example, the fins 134(1)-134(N) may support the elongated tube 124 when the cap 108 is tightened to a bolt.

The fins 134(1)-134(N) may or may not be positioned the distance 122 from the bottom aperture 114. For example, one or more of the fins 134(1)-134(N) may be positioned past the distance 122 from the bottom aperture 114 closer to the top 112 of the body 110. While FIG. 1 illustrates the cap 108 having multiple fins 134(1)-134(N) supporting the elongated tube 124, other structural members are contemplated. For example, the structural member may comprise a lattice structure (e.g., thin strips of material), flat plates, ribs, etc.

The cap 108 may comprise a single unitary body. For example, the cap 108 may be formed of a single unit of material. For example, the body 110, the elongated tube 124, and the multiple fins 134(1)-134(N) may be formed of a single unit of material. For example, the cap 108 may not have any separate or loose parts. The single unit of material may comprises plastic, ceramic, metal, wood, or composite.

While the exterior of the cap 108 is illustrated as having a dome shaped surface, the exterior of the cap 108 may be any shape. For example, the exterior of the cap 108 may have any decorative shape. For example, the exterior of the cap 108 have a decorative shape of an animal (e.g., a horse's head), a vehicle (e.g., a sports car), a structure (e.g., a castle), or the like for desired aesthetics.

The bottom view 104 of the cap 108 depicts a section line A-A taken along the middle of the cap 108. The cross-sectional view 106 of an illustrative cap 108 illustrates cross-sectional view taken along the section line A-A. The cross-sectional view 106 depicts the elongated tube 124 may include threads 136 on an inside surface of the wall 130 of the elongated tube 124 for threadably coupling the cap 108 to a bolt. For example, the threads 136 may comprise unified coarse (UNC) threads 1/4-20 or UNC threads 5/16-18. While FIG. 1 illustrates threads 136 on an inside surface of the wall 130, the elongated tube may comprise other fastening mechanisms. For example, the elongated tube may comprise a press fit fastening mechanism. For example, the elongated tube may have slits in the elongated tube to allow it to expand to be pressed down over the bolt.

In another example, the elongated tube 124 may include a hole 138 extending from the top 126 of the elongated tube 124 to the bottom 128 of the elongated tube 124. The hole 138 may be oversized by about 1/64 inches, and the oversized hole 138 may provide for tapping the UNC thread 136 in the oversized hole 138. In one example, the oversized hole 138 may be for tapping the UNC thread 136 1/64 inches larger than a standard size to accommodate a loose thread fit needed to allow the cap 108 to be mounted on a bolt having a disturbed thread. For example, the oversized UNC thread 136 may allow the cap 108 to be threaded onto disturbed threads as a result of a bolt having been cut or snapped off. While FIG. 1 illustrates UNC threads 1/4-20 or UNC threads 5/16-18, other threads are contemplated. For example, the thread may be metric coarse threads (e.g., M6×1.0 or M8×1.25) or any other sized threads.

FIG. 1 depicts the top 112 of the body 110 may be spaced a distance 140 of about 1.5 inches to about 2.5 inches from the bottom 114 of the body 110. The distance 140 may be tall enough to thread the cap 108 onto a bolt after installing a toilet without cutting the bolt off. Because the cap 108 is tall enough to thread the cap 108 on a bolt without reducing a length of the bolt, it takes less time to install a toilet. Moreover, because the cap 108 is tall enough to thread the cap 108 on a bolt without reducing a length of the bolt a nut fastened to the bolt having the unreduced length can be removed at a later date without fighting damaged threads. Further, because the cap 108 is threaded on the bolt having the unreduced length, the cap 108 is prevented from being dislodged "popped off" from the bolt.

For example, because the cap 108 is threaded on the bolt, the cap 108 remains coupled to the bolt during cleaning Further, the cap 108 may be installed on a preexisting bolt that has lost its cap. For example, if a preexisting bolt securing a toilet to a floor is missing a cap used to cover the bolt, the tall cap 108 may couple to the existing bolt to cover the existing bolt.

The bottom aperture 114 of the body 110 may have an outside diameter 142 of about 1.0 inches to about 2.0 inches. In one example, the bottom aperture 114 may have an outside diameter 142 of about 1 1/2 inches to allow the cap 108 to fit over a bolt, a washer, and/or a wafer. For example, because the bottom aperture 114 may have an outside diameter 142 of about 1 1/2 inches, the bottom aperture 114 may receive a bolt, a washer, and/or a wafer mounted on a bolt securing a toilet to a floor.

The elongated tube 124 may have a length 144 of about 1.2 inches to about 1.6 inches. The length 144 of the elongated tube 124 may be about two times the distance 122 the receptacle 120 extends from the bottom 114 of the body toward the top 112 of the body. The elongated tube 124 may have an outside diameter 148 of about 3/8 inches to about 5/8 inches. While the cap 108 is illustrated having a wall thickness of about 1/16 inches, the wall thickness may be any thickness to accommodate manufacturing of the cap 108. For example, the wall thickness may be a thickness to accommodate a mold design (e.g., a plastic mold design) of the cap 108.

Figure 2:
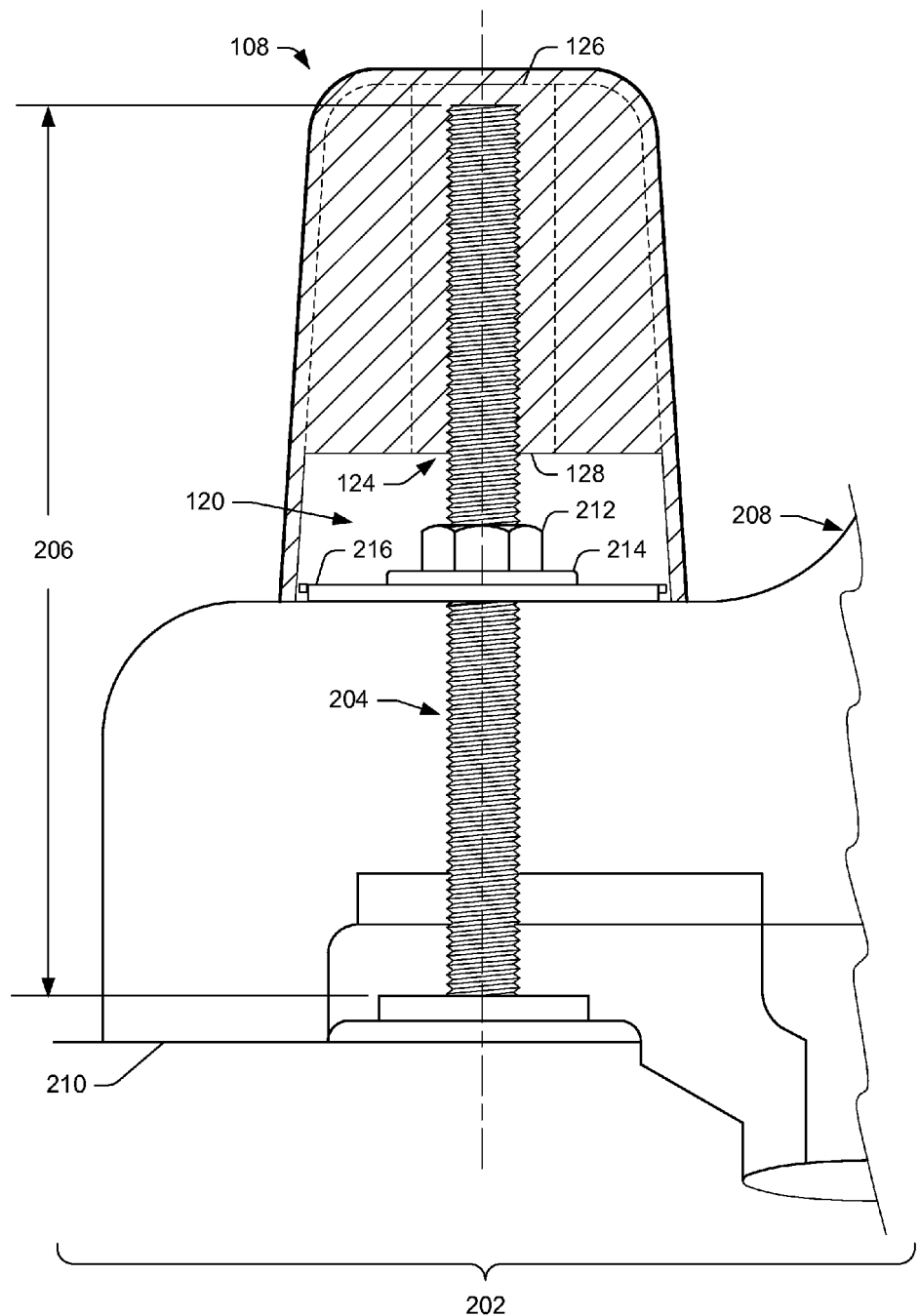
FIG. 2 depicts a cross-sectional view of the cap illustrated in FIG. 1 covering a bolt having an unreduced length and fastening a toilet to a floor.

FIG. 2 depicts a cross-sectional view 202 of the cap 108 illustrated in FIG. 1 covering a bolt 204 having an unreduced length 206. The bolt 204 may have a finished end to facilitate easier threading. The bolt 204 having an unreduced length 206 may fasten a toilet 208 to a floor 210. While FIG. 2 illustrates the bolt 204 comprising a closet bolt having the unreduced length 206 for fastening the toilet 208 to the floor 210, the bolt 204 may be any type bolt. For example, the bolt 204 may be a "snap off" type toilet bolt, an anchor bolt, a compression anchor bolt, carriage bolt, machine bolt, stove bolt, or the like. The bolt 204 may comprise UNC threads 1/4-20, UNC threads 5/16-18, M6×1.0, M8×1.25, or any other sized threads. While FIG. 2 illustrates the unreduced length 206 of the bolt 204 may be about 2 1/2 inches, other lengths are contemplated. For example, the unreduced length 206 may be about 1.5 inches to about 5.5 inches.

FIG. 2 depicts the elongated tube 124 may include threads arranged in an inside surface of the elongated tube 124 from the top 126 of the elongated tube 124 to the bottom 128 of the elongated tube 124 to receive the unreduced length 206 of the bolt 204. The bolt 204 having the unreduced length 206 may include a nut 212 and a washer 214 coupled to the bolt 204. For example, at a time of installing the toilet 208 a user may fasten the toilet 208 to the floor 210 via the bolt 204, nut 212, and washer 214 and the receptacle 120 of the cap 108 may removably receive the nut 212 and the washer 214 on the bolt 204 having the unreduced length 206. In another example, a bolt may include the nut 212, the washer 214, and a wafer 216. For example, the toilet 208 may have been previously fastened to the floor 210 using a bolt having a reduced length (not shown) and a two piece cap (not shown). The two piece cap may have been previously coupled to the wafer 216 to cover the bolt having a reduced length, and subsequently the two piece cap was dislodged from the wafer 216 and lost. In this example, where a two piece cap is missing and no longer covering a bolt, the cap 108 may couple to the bolt and removably receive the nut 212, the washer 214, and the wafer 216 on the bolt having the reduced length.

The cap 108, the bolt 204, the nut 212, the washer 214 may define a kit to be used to install a toilet to a floor. While FIG. 2 illustrates a kit comprising the cap 108, the bolt 204, the nut 212, and the washer 214, the kit may comprise additional components for installing a toilet to a floor. For example, the kit may further comprise a gasket (e.g., a wax ring, a reinforced wax ring, a flexible waxless seal), a flange (e.g., a flange extension ring), shims, etc for installing a toilet to a floor.

Conclusion

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. For example, in various embodiments, any of the structural features and/or methodological acts described herein may be rearranged, modified, or omitted entirely. For example, the shape, size, and configuration of the cap may be varied.

What is claimed is:

1. A decorative cap for covering a closet bolt assembly usable to fasten a toilet to a floor, the decorative cap comprising:
    a body having a top opposite a bottom aperture and a wall extending from the top to the bottom aperture, the bottom aperture having an edge arranged around an inside of the bottom aperture defining a receptacle, the receptacle extending a distance of about ¼ inch to about ⅞ inch from the bottom aperture toward the top of the body, and the receptacle to removably receive a nut and/or a washer of the closet bolt assembly, the body further comprising:
        an elongated tube having a top opposite a bottom, a wall extending from the top to the bottom, and a length of about 1.3 inches to provide for the elongated tube to fasten onto an untrimmed or unsnapped bolt of the closet bolt assembly, the bottom of the elongated tube positioned the distance of about ¼ inch to about ⅞ inch from the bottom aperture to provide for the bottom of the elongated tube to fasten onto a trimmed or snapped bolt of the closet bolt assembly, the elongated tube arranged longitudinally along a longitudinal axis of the body, and the elongated tube including unified coarse (UNC) threads ¼"-20 or UNC threads 5/16"-18 on an inside surface of the elongated tube, the UNC threads ¼"-20 or UNC threads 5/16"-18 to provide a loose thread fit to couple the decorative cap to the untrimmed or unsnapped bolt of the closet bolt assembly, or the trimmed or snapped bolt of the closet bolt assembly to prevent the decorative cap from being dislodged from the bolt of the closet bolt assembly and not to fasten the toilet to the floor; and
    multiple fins arranged longitudinally along the longitudinal axis of the body and spaced along a perimeter of the wall of the elongated tube, each fin attached to the wall of the elongated tube and the wall of the body.

2. The decorative cap of claim 1, wherein the body, the elongated tube, and the multiple fins are formed of a single unit of material.

3. The decorative cap of claim 2, wherein the single unit of material comprises plastic, ceramic, metal, wood, or composite.

4. The decorative cap of claim 1, wherein the top of the elongated tube comprises the top of the body.

5. A cap for covering a closet bolt assembly for fastening a toilet to a floor, the cap comprising:
    a single unitary body comprising:
        a top opposite a bottom and a wall extending from the top to the bottom;
        an aperture arranged in the bottom of the single unitary body defining a receptacle, the receptacle extending a distance of about ¼ inch to about ⅞ inch from the bottom of the single unitary body toward the top of the single unitary body, the receptacle to removably receive a nut and/or a washer of the closet bolt assembly;
        an elongated tube having a top opposite a bottom and a wall extending from the top to the bottom, the elongated tube having a length of about 1.3 inches to provide for the elongated tube to fasten onto an untrimmed or unsnapped bolt of the closet bolt assembly, the bottom of the elongated tube positioned the distance of about ¼inch to about ⅞inch from the bottom aperture to provide for the bottom of the elongated tube to fasten onto a trimmed or snapped bolt of the closet bolt assembly, and the elongated tube arranged longitudinally along a longitudinal axis of the single unitary body for coupling the cap to the untrimmed or unsnapped bolt of the closet bolt assembly, or the trimmed or snapped bolt of the closet bolt assembly; and
    multiple fins arranged longitudinally along the longitudinal axis of the single unitary body and spaced along a perimeter of the wall of the elongated tube, each fin attached to the wall of the elongated tube and the wall of the single unitary body.

6. The cap of claim 5, wherein the top of the single unitary body is spaced a distance of about 1.5 inches to about 2.5 inches from the bottom of the single unitary body.

7. The cap of claim 5, wherein the aperture arranged in the bottom of the single unitary body is about 1.0 inch to about 2.0 inches in diameter.

8. The cap of claim 5, further comprising unified coarse (UNC) threads in an interior surface of the elongated tube.

9. The cap of claim 8, wherein the unified coarse (UNC) threads comprise ¼"-20 or 5/16"-18 threads.

10. The cap of claim 5, wherein the elongated tube has an outside diameter of about ⅜ inch to about ⅝ inch.

11. The cap of claim 5, wherein the single unitary body comprises plastic.

12. A kit for installing a toilet to a floor, the kit comprising:
a closet bolt having an unreduced length of about 2½ inches for fastening the toilet to the floor;
a single unitary cap for covering the closet bolt having the unreduced length, the single unitary cap comprising;
 a top opposite a bottom and a wall extending from the top to the bottom;
 an aperture arranged in the bottom of the single unitary cap defining a receptacle, the receptacle extending a distance from the bottom of the single unitary cap toward the top of the single unitary cap, the receptacle to removably receive a nut on the closet bolt having the unreduced length; and
 an elongated tube having a top opposite a bottom, a wall extending from the top to the bottom, a length of about 1.3 inches, and unified coarse (UNC) threads ¼"-20 or UNC threads 5/16"-18 arranged in an inside surface of the elongated tube from the top of the elongated tube to the bottom of the elongated tube to receive at least a portion of the unreduced length of the closet bolt and provide a loose thread fit to couple the single unitary cap to the closet bolt having the unreduced length to prevent the single unitary cap from being dislodged from the closet bolt having the unreduced length and not to fasten the toilet to the floor, the bottom of the elongated tube positioned at about a distance from the aperture arranged in the bottom of the single unitary cap, and the elongated tube arranged longitudinally along a longitudinal axis of the single unitary cap for coupling the single unitary cap to the closet bolt having the unreduced length.

13. The kit of claim 12, further comprising a washer to be received by the closet bolt having the unreduced length, and wherein the receptacle removably receives the nut and the washer on the closet bolt having the unreduced length.

14. The kit claim 12, wherein the single unitary cap comprises plastic.

* * * * *